United States Patent [19]

Ryan

[11] 4,394,148

[45] Jul. 19, 1983

[54] SHORT CIRCUIT PROOF DRIVER AND ALARM CIRCUIT FOR A SOLENOID IN A GLASSWARE FORMING MACHINE

[75] Inventor: William H. Ryan, Toledo, Ohio

[73] Assignee: Owens-Illinois, Inc., Toledo, Ohio

[21] Appl. No.: 314,607

[22] Filed: Oct. 26, 1981

[51] Int. Cl.³ .............................................. C03B 9/40
[52] U.S. Cl. ......................................... 65/159; 65/160
[58] Field of Search ......... 65/159, 163, 164, DIG. 13; 251/30, 131, 132

[56] References Cited

U.S. PATENT DOCUMENTS 3,059,663 10/1962 Whitenack ............................ 251/30
3,762,907 10/1973 Quinn et al. ........................... 65/164

FOREIGN PATENT DOCUMENTS 2458106 1/1981 France ................................ 251/131

Primary Examiner—Arthur D. Kellogg
Attorney, Agent, or Firm—Gerald T. Welch; Myron E. Click; David H. Wilson

[57] ABSTRACT

A short circuit proof driver and alarm circuit for a solenoid actuator in a glassware forming machine is disclosed. Power to the solenoid is switched from a power source by a VMOS enhancement mode power transistor. Under normal operating conditions, the power transistor will be operated in saturation, whereby very little voltage is dropped between the drain and the source. When a short circuit condition occurs in the solenoid or connecting cable, the power transistor will be pulled out of saturation and the amount of voltage drop will become significant. Circuitry is provided for limiting current flow through the power transistor to a value somewhat above the maximum normal load current. The components of the system are selected to operate properly in the short circuit condition, thereby preventing the accidental activation of a solenoid in the glassware forming machine. A detector circuit senses the increased power dissipation across the power transistor and generates a signal to an alarm circuit to generate an alarm signal. The alarm signal can be used by an operator to determine which solenoid has failed.

18 Claims, 3 Drawing Figures

SHORT CIRCUIT PROOF DRIVER AND ALARM CIRCUIT FOR A SOLENOID IN A GLASSWARE FORMING MACHINE

BACKGROUND OF THE INVENTION

1. Field of the Invention

The present invention relates in general to solenoid drivers and in particular to a short circuit proof driver and alarm circuit for a solenoid in a glassware forming machine.

2. Description of the Prior Art

The individual section glassware forming machine is well known and includes a plurality of sections, each having means for forming glassware articles in a timed predetermined sequence of steps. Typically, the sections are fed from a single source of molten glass. The source forms gobs of molten glass which are distributed to the individual sections. The sections are operated in synchronism at a relative phase difference such that one section is receiving a gob while another section is delivering a finished glassware article to a conveyor and one or more other sections are performing various ones of the intermediate forming steps.

Typically, an electronic control means is utilized to synchronize the operation of the individual sections. The forming means in each individual section are operated by pneumatic motors or actuators. The electronic control means generates control signals through an interface circuit to actuate solenoid-controlled valve blocks which operate the forming means. Such a control system is disclosed in U.S. Pat. No. 4,152,134.

Solenoid driver circuits which have been utilized in prior art glassware forming machines have been subject to destruction caused by short circuits in the controlled solenoid. Such short circuits occur frequently in older machinery, resulting in excessively high current being drawn through the solenoid driver circuit. Also, a short circuit can occur in a cable connecting the solenoid driver to the controlled solenoid in the valve block, resulting from normal fatigue or accidental injury to the cable. Such an occurrence could activate a solenoid unintentionally, causing mechanical motion in the glassware forming machine and the possibility of injury to an operator working on the machine.

SUMMARY OF THE INVENTION

The present invention relates to a short circuit proof driver and alarm circuit for a solenoid in a glassware forming machine. Power to the solenoid is switched from a power source by a VMOS enhancement mode power transistor. Under normal operating conditions, the enhancement mode power transistor is operated in saturation with very little voltage drop between the drain and the source of the transistor.

When a short circuit condition occurs, the electrical resistive load of the solenoid will be shorted to ground potential, causing the enhancement mode power transistor to be pulled out of saturation. The amount of voltage drop between the drain and the source of the power transistor will therefore become significant and the transistor will dissipate power. The components of the driver circuit are selected to tolerate this increased power dissipation, thereby preventing the accidental activation of a solenoid in the forming machine. The driver circuit operates the power transistor at a constant gate to source voltage to cause the constant current output to be limited at a value somewhat above the maximum normal load current. A detector circuit senses the increased voltage drop across the power transistor and generates a signal to an alarm circuit to generate an alarm signal. The alarm signal can be used by an operator to determine which solenoid has failed.

It is an object of the present invention to provide a short circuit proof driver and alarm circuit for a solenoid in a glassware forming machine.

It is another object of the present invention to increase the safety of glassware forming machines.

It is a further object of the present invention to detect and identify a short circuited solenoid in a glassware forming machine.

Other objects and advantages of the present invention will become apparent to those skilled in the art from the following detailed description of the preferred embodiments, when read in light of the accompanying drawings.

DETAILED DESCRIPTION OF THE PREFERRED EMBODIMENTS

Figure 1:
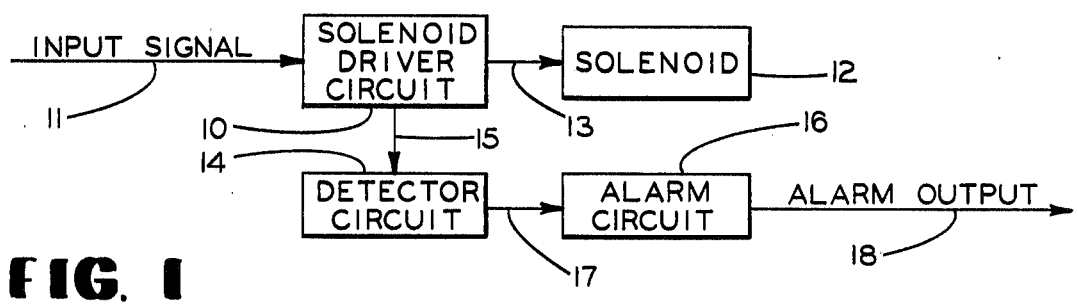
FIG. 1 is a block diagram of a short circuit proof solenoid driver and alarm circuit in accordance with the present invention.

Referring now to the drawings, there is illustrated in FIG. 1 a block diagram of a short circuit proof solenoid driver and alarm circuit in accordance with the present invention. Control signals from an electronic control means (not shown) are generated over an INPUT SIGNAL line 11 to a solenoid driver circuit 10. In response to the received control signals, the solenoid driver circuit 10 actuates a solenoid 12 in the valve block (not shown) of the glassware forming machine over an output line 13. The solenoid 12 appears to the solenoid driver circuit 10 as being an electrical resistive load, the amount of the resistive load being a first electrical characteristic of the particular solenoid 12 being used. As will be explained in greater detail below, the solenoid driver circuit 10 is designed to operate properly even if the electrical resistive load of the solenoid 12 drops to zero, as would occur if the solenoid 12 or the cable 13 connecting the solenoid 12 to the solenoid driver circuit 10 were short circuited to ground potential. Although the present invention will be described in terms of solenoid-controlled forming means, it will be appreciated that any electronic forming means having a first electrical characteristic resistive load when functioning in a normal mode and a lesser, second electrical characteristic resistive load when functioning in a failure mode can be utilized with the present invention.

A detector circuit 14 is responsive to a signal from the solenoid driver circuit 10 on a line 15 for generating a signal to an alarm circuit 16 when such a short circuit situation occurs. In response to the signal from the detector circuit 14 on a line 17, the alarm circuit 16 generates a signal over an ALARM OUTPUT line 18 to an external alarm indicator (not shown). The alarm indicator can provide an audible or visual warning signal to an operator to determine which solenoid is bad and to possibly shut down the glassware forming machine. Alternatively, the alarm signal can be generated directly to the electronic control means of the glassware forming machine for indication or control purposes.

Figure 2:
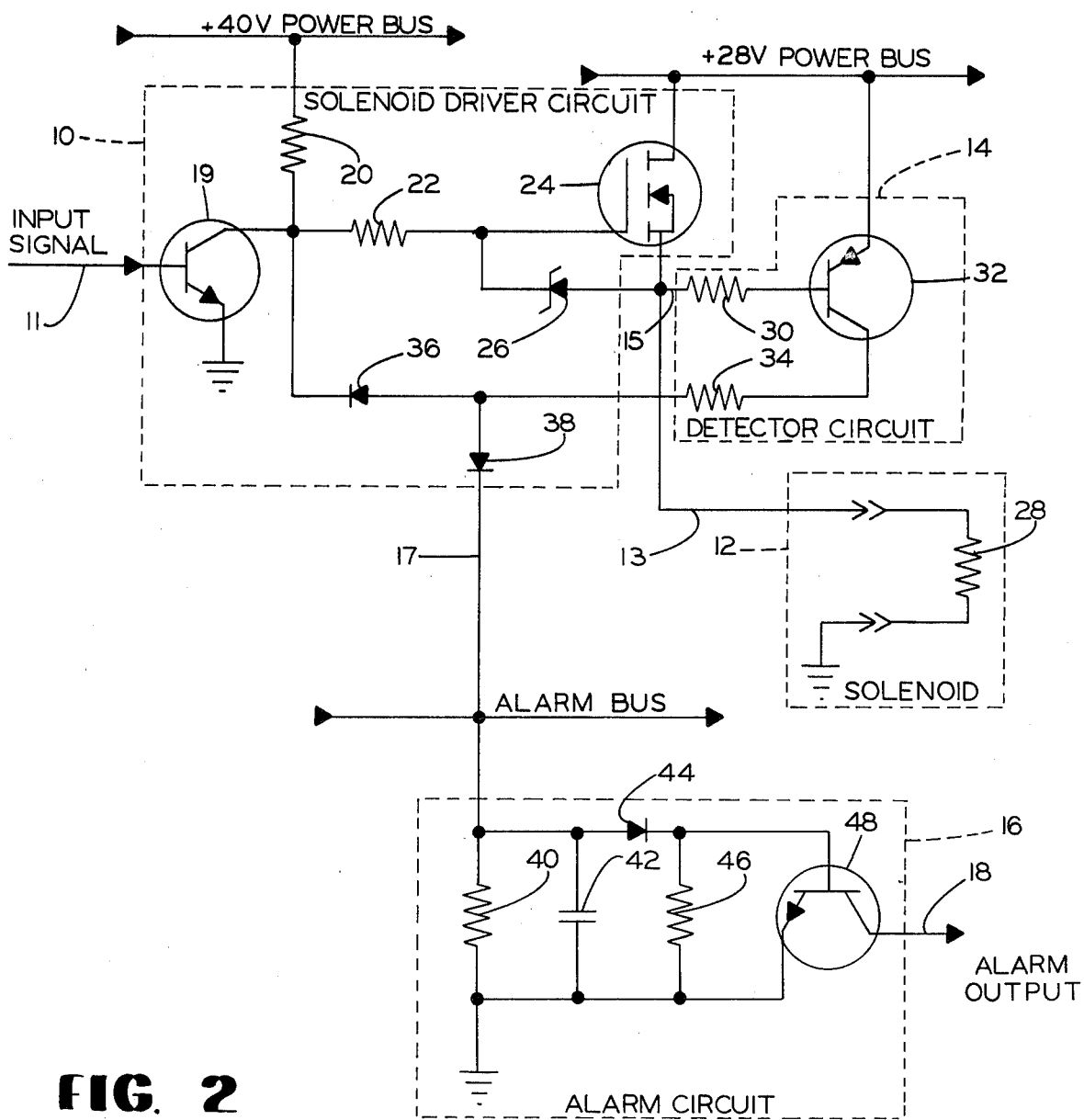
FIG. 2 is a schematic diagram of one embodiment of the short circuit proof solenoid driver and alarm circuit of FIG. 1.

Referring now to FIG. 2, there is illustrated a schematic diagram of one embodiment of a short circuit proof solenoid driver and alarm circuit in accordance with the present invention. The control signals from the electronic control means on the INPUT SIGNAL line 11 are fed to the solenoid driver circuit 10. The INPUT SIGNAL line 11 is connected to the base of an NPN transistor 19. The NPN transistor 19 can be a portion of a Model DS3611 dual AND peripheral driver manufactured by National Semiconductor Corporation of Santa Clara, Calif. The emitter of the NPN transistor 19 is connected to ground potential. The collector of the NPN transistor 19 is connected through a resistor 20 to a +40 V POWER BUS line. The +40 V POWER BUS line is connected to a positive forty volt potential source (not shown).

The collector of the NPN transistor 19 is also connected through a resistor 22 to the gate of an N-channel VMOS enhancement mode power transistor 24. The power transistor 24 can be a Model IVN 5201 transistor manufactured by Intersil Incorporated. The drain of the power transistor 24 is connected to a +28 V POWER BUS line. The +28 V POWER BUS line is connected to a positive twenty-eight volt potential source (not shown). The source of the power transistor 24 is connected to an anode of a zener diode 26 which has a cathode connected to the gate of the power transistor 24.

The solenoid driver circuit 10 is connected to the solenoid 12 by the line 13. In the illustrated embodiment, the source of the power transistor 24 is connected by the line 13 through an electrical resistive load 28 of the solenoid 12 to ground potential. As mentioned above, a short circuit situation occurs when the solenoid 12 or the cable 13 connecting the solenoid 12 to the solenoid driver circuit 10 fails, causing the source of the power transistor 24 to be connected directly to ground potential. The resistive load 28 connected to the solenoid driver circuit 10 would therefore fall to approximately zero.

The detector circuit 14 is responsive to the signal from solenoid driver circuit 10 on the line 15 for generating a signal to the alarm circuit 16 on the line 17. In the illustrated embodiment, the source of the power transistor 24 is connected through a resistor 30 to the base of a PNP transistor 32. The PNP transistor 32 can be a Model 2N5400 transistor manufactured by National Semiconductor Corporation. The emitter of the PNP transistor 32 is connected to the +28 V POWER BUS line. The collector of the PNP transistor 32 is connected through a resistor 34 to the anode of a diode 36. The cathode of the diode 36 is connected to the collector of the NPN transistor 19.

The alarm circuit 16 is responsive to the signals generated by the detector circuit 14 for generating signals over the ALARM OUTPUT line 18. The junction of the resistor 34 and the diode 36 is connected to the anode of a diode 38. The cathode of the diode 38 is connected to an ALARM BUS line by the line 17. The ALARM BUS line can be connected to other alarm circuits or to the electronic control means of the glassware forming machine. The ALARM BUS line is connected to the junction of a resistor 40, a capacitor 42, and the anode of a diode 44. The cathode of the diode 44 is connected to a resistor 46 and to the base of an NPN transistor 48. The other side of the resistor 40, the capacitor 42, and the resistor 46, and the emitter of the NPN transistor 48 are all connected to ground potential. The collector of the NPN transistor 48 is connected to the ALARM OUTPUT line 18.

In operation, the control signals from the electronic control means of the glassware forming machine are fed over the INPUT SIGNAL line 11 to the solenoid driver circuit 10. When it is desired to de-energize the solenoid 12, a high or positive potential control signal is fed over the INPUT SIGNAL line to the base of the NPN transistor 19. The control signal causes the NPN transistor 19 to be turned on, allowing electrical current to flow therethrough. As a result, current can flow through the resistor 20 to ground potential and, therefore, there is a forty volt potential drop thereacross. Thus, the voltage present at the gate of the power transistor 24 is near ground potential. Being an enhancement mode device, the power transistor 24 is cut off in this condition and no current flows through it from the drain to the source. Consequently, no current flows into the resistive load 28 and the solenoid 12 is de-energized.

When the solenoid 12 is in the de-energized state, no voltage is dropped across the solenoid 12 and the line 13 is at the ground potential. Thus, the PNP transistor 32 of the detector circuit 14 is turned on and current flows through the diode 36 to the transistor 19 which is turned on. Thus, the current is shunted from flowing through the diode 38. The NPN transistor 48 of the alarm circuit 16 is also cut off and no signal is generated over the ALARM OUTPUT line 18.

When it is desired to energize the solenoid 12, a low or negative potential control signal is applied over the INPUT SIGNAL line 11 to the base of the NPN transistor 19. The NPN transistor 19 is cut off, preventing any electrical current from flowing therethrough. Since no current can flow through the resistors 20 and 22, the voltage present at the gate of the power transistor 28 rises to approximately positive forty volts. The power transistor 24 will be turned on, allowing electrical current to flow through the power transistor 24 into the resistive load 28 of the solenoid 12. It will be appreciated that the power transistor 24 acts as an electronic switch, alternately connecting and disconnecting the solenoid 12 from the +28 POWER BUS line in response to the control signal input. The large positive potential voltage present at the source of the power transistor 24 causes the PNP transistor 32 to remain cut off. Thus, no current flows from the collector of the PNP transistor 32 to the alarm circuit 16 and no signal is generated over the ALARM OUTPUT line 18. This is the normal operating mode of the power transistor 24.

Enhancement mode power transistors, such as the power transistor 24, have a constant current output characteristic when operated with a constant gate-to-source voltage. The zener diode 26 maintains a constant voltage drop from the gate to the source of the power transistor 24. It has been found desirable to select the zener diode 26 such that a 4.7 volt potential drop is maintained from the gate to the source of the power transistor 24. Given this voltage bias, the maximum constant current output from the source of the power transistor 24 will be approximately 0.5 amperes. This is not to say that the output current of the power transistor 24 will be 0.5 amperes, but that the output current will be limited to that value. If the current drawn by the resistive load 28 from the +28 V POWER BUS line is less than the constant current output characteristic of 0.5 amperes, the power transistor 24 will be driven into saturation. The resistive load 28 of the solenoid 12 typically used in a glassware forming machine normally draws approximately 0.3 amperes of the current from the +28 V POWER BUS line. Hence, the power transistor 24 will be driven into saturation and the voltage drop from the drain to the source will be very small, typically about +0.2 volts. The voltage present at the source of the power transistor 24 will, therefore, be approximately +27.8 volts.

If a defect in the solenoid 12 or the connecting cable causes the resistive load 28 to be shorted to ground potential, the source of the power transistor 24 will be pulled down to approximately zero volts. The solenoid 12 will then be able to draw more current than the normal output characteristic of the power transistor 24 and, hence, the power transistor 24 will be pulled out of saturation. Since the drain of the power transistor 24 is connected to the +28 V POWER BUS line and the source of the power transistor 24 is connected to ground potential, the power transistor 24 will be forced to dissipate considerable power thereacross. To prevent the accidental activation of the solenoid 12, the power transistor 24 and the other components of the circuit must be selected such that they are capable of dissipating this power without suffering destruction. Thus, the power transistor 24 can reliably continue to supply current to the solenoid 12 when the solenoid 12 is functioning in either a normal or a short circuit situation.

When a short circuit condition occurs and the voltage potential present at the source of the power transistor 24 drops to ground potential, the PNP transistor 32 in the detector circuit 14 will be turned on. Current will flow from the collector of the PNP transistor 32 through the resistor 34 and the diode 38 to the alarm circuit 16 over the line 17. The current flow into the alarm circuit 16 will turn on the NPN transistor 48, causing a signal to be generated over the ALARM OUTPUT line 18. The current can also be carried over the ALARM BUS line to other alarm circuits or to the electronic control means. Thus, an alarm signal will be generated when the short circuit is detected by the detector circuit 14.

Figure 3:
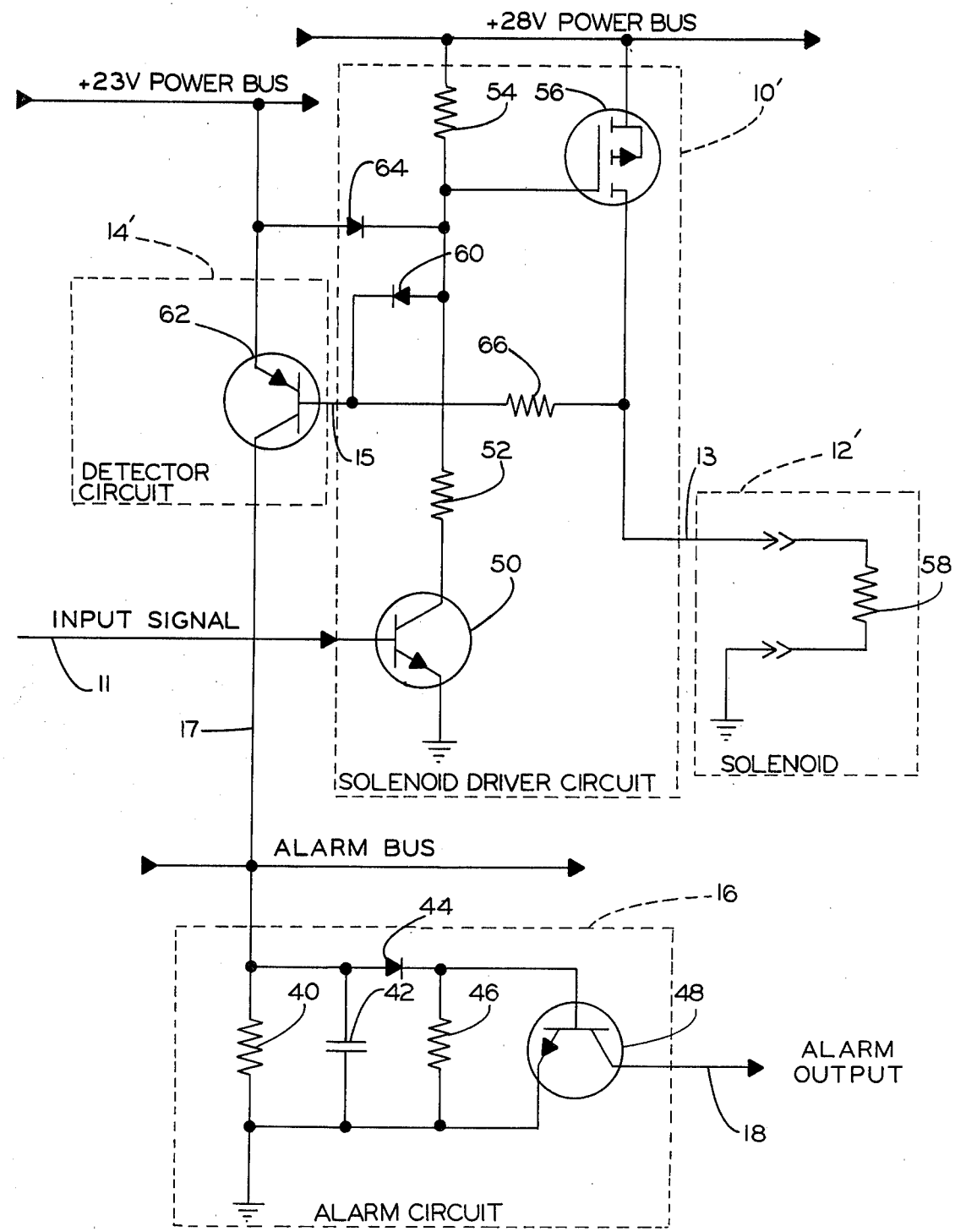
FIG. 3 is a schematic diagram of another embodiment of the short circuit proof solenoid driver and alarm circuit of FIG. 1.

Referring now to FIG. 3, there is illustrated an alternative embodiment of the short circuit proof solenoid driver and alarm circuit of FIG. 1. The control signals from the electronic control means are fed over the INPUT SIGNAL line 11 to the solenoid driver circuit 10'. The INPUT SIGNAL line is connected to the base of an NPN transistor 50. The NPN transistor 50 can be a portion of a Model DS3612 dual NAND peripheral driver manufactured by National Semiconductor Corporation.

The emitter of the NPN transistor 50 is connected to ground potential. The collector of the NPN transistor 50 is connected through a resistor 52 and a resistor 54 to a +28 V POWER BUS line. The +28 V POWER BUS line is connected to a positive twenty-eight volt potential source (not shown). The junction of the resistor 52 and the resistor 54 is connected to the gate of a P-channel enhancement mode power transistor 56. The power transistor 56 can be a Model IRF 9531 transistor manufactured by International Rectifier Incorporated. The source of the power transistor 56 is connected to the +28 V POWER BUS line. The drain of the power transistor 56 is connected to a resistive load 58 of the solenoid 12' by the line 13. The resistive load 58 of the solenoid 12' is connected to ground potential.

The junction of the resistor 52 and the resistor 54 is also connected to the anode of a diode 60. The cathode of the diode 60 is connected to the base of a PNP transistor 62. The PNP transistor 62 can be a Model 2N5400 transistor manufactured by National Semiconductor Corporation. The emitter of the PNP transistor 62 is connected to a +23 V POWER BUS line. The +23 V POWER BUS line is connected to a positive twenty-three volt potential source (not shown). If desired, a five volt zener diode (not shown) can be connected between the +28 V POWER BUS line and the +23 V POWER BUS line in lieu of the positive twenty-three volt source. The emitter of the PNP transistor 62 is also connected to the anode of a diode 64. The cathode of the diode 64 is connected to the junction of the resistors 52 and 54, the anode of the diode 60, and the gate of the power transistor 56. The cathode of the diode 60 and the base of the PNP transistor 62 are also connected through a resistor 66 to the drain of the power transistor 56 and to the resistive load 58 of the solenoid 12'.

The collector of the PNP transistor 62 is connected to the ALARM BUS line and the alarm circuit 16 by the line 17. The ALARM BUS line and the components utilized in the alarm circuit 16 are identical to the components described above in the alternative embodiment. Hence, the same reference numerals are utilized to designate the various components therein.

In operation, the solenoid driver and alarm circuit of FIG. 3 is similar to the embodiment illustrated in FIG. 2. However, it will be appreciated that the embodiment of FIG. 2 utilizes an N-channel power transistor 24, whereas the embodiment illustrated in FIG. 3 utilizes a P-channel power transistor 56. The P-channel embodiment, however, uses fewer components. Also, it has been found that the P-channel embodiment has a larger allowance for component values. Therefore, the P-channel embodiment illustrated in FIG. 3 is more reliable and less expensive than the N-channel embodiment illustrated in FIG. 2.

When it is desired to de-energize the solenoid 12', a low or negative potential control signal is applied on the INPUT SIGNAL line 11 to the base of the NPN transistor 50. The low signal applied to the base causes the NPN transistor 50 to be cut off, preventing any current from flowing through the resistors 52 and 54. Thus, there is no voltage drop across the resistor 54 and the gate and the source of the power transistor 56 will be at approximately the same potential level of positive twenty-eight volts. Being an enhancement mode device, the power transistor 56 will be cut off in this condition and no current will flow from the drain to the solenoid 12'. Thus, the PNP transistor 62 in the detector circuit 14' will be cut off and no current will flow to the alarm circuit 16.

When it is desired to energize the solenoid 12', a positive potential control signal is applied on the INPUT SIGNAL line 11 to the base of the NPN transistor 50. The NPN transistor 50 is turned on, allowing current to flow through the resistors 52 and 54 to ground potential. Since the +23 V POWER BUS line is connected through the diode 64 to the gate of the power transistor 56, the voltage potential present at the gate will be positive twenty-three volts less the voltage drop across the diode 64, or approximately +22.3 volts. Since the voltage drop from the gate to the source of the power transistor 56 is now approximately −5.7 volts, the power transistor 56 will be turned on and current will flow from the +28 V POWER BUS line to the resistive load 58 of the solenoid 12'. As described above, the current drawn by the resistive load 58 is less than the normal constant current output of the power transistor 56. The power transistor 56 will be driven into saturation and very little voltage will dropped thereacross. Hence, a large positive voltage is applied to the base of the PNP transistor 62 of the detector circuit 14', causing it to remain cut off and prevent any current from flowing to the alarm circuit 16.

If a defect in the solenoid 12' or the connecting cable causes the resistive load 58 to be short circuited to ground potential, the drain of the power transistor 56 will be pulled down to approximately zero volts. The current flow will be more than the normal output characteristic of the power transistor and, hence, the power transistor 56 will pulled out of saturation. As mentioned above, the power transistor 56 and other components of the circuit are selected to withstand this increased power dissipation.

When the drain of the power transistor 56 is short circuited to ground potential, the base of PNP transistor 62 of the detector circuit will be drawn below the emitter voltage level of positive twenty-three volts. This will cause the PNP transistor 62 to be turned on, allowing current to flow therethrough to the alarm circuit 16. The alarm circuit 16 will be activated as described above, generating a signal over the ALARM OUTPUT line 18.

In accordance with the provisions of the patent statutes, the principle and mode of operation of the present invention have been explained and illustrated in their preferred embodiments. However, it must be understood that the present invention can be practiced otherwise than as specifically explained and illustrated without departing from its spirit or scope.

What is claimed is:

1. In a glassware forming machine including at least one forming means for forming articles of glassware, the forming means including an actuator having a first electrical characteristic when functioning in a normal operating mode and a second electrical characteristic when in a failure operating mode and a source of power connectable to the actuator, a self-protecting driver circuit for selectively actuating the actuator comprising: driver means for selectively connecting the actuator to the source of power whereby the actuator is energized in the normal operating mode; said driver means having an active element for limiting the amount of electrical current drawn therethrough to a predetermined amount when the forming means is short-circuited whereby the actuator remains energized in the failure operating mode.

2. A self-protecting driver circuit in accordance with claim 1 further comprising detector circuit means connected to said driver means for detecting when the actuator is in the failure operating mode and generating a detection signal in response thereto.

3. A self-protecting driver circuit in accordance with claim 2 further comprising means responsive to said detection signal for generating an alarm signal.

4. A self-protecting driver circuit in accordance with claim 1 wherein said active element is a VMOS enhancement mode power transistor.

5. A self-protecting driver circuit in accordance with claim 4 wherein said power transistor is a P-channel transistor.

6. A self-protecting driver circuit in accordance with claim 4 wherein said power transistor is an N-channel transistor.

7. A self-protecting driver circuit in accordance with claim 4 wherein said driver means further comprises means for maintaining a predetermined voltage potential between the gate and the source of said power transistor.

8. A self-protecting driver circuit in accordance with claim 7 wherein said means for maintaining a predetermined voltage potential is a zener diode.

9. In a glassware forming machine including at least one forming means for forming articles of glassware, the forming means including an actuator having a first electrical characteristic when in a normal operating mode and a second electrical characteristic when in a failure operating mode and a source of power connectable to the actuator, a self-protecting driver circuit for selectively actuating the actuator comprising:
driver means for selectively connecting the actuator to the source of power whereby the actuator is energized in the normal operating mode;
said driver means having an active element for limiting the amount of electrical current drawn therethrough to a predetermined amount when the forming means is shortcircuited whereby the actuator remains energized in the failure operating mode;
detector circuit means responsive to said driver means for detecting when the actuator is in a failure operating mode and generating a detection signal in response thereto; and
alarm circuit means responsive to said detection signal for generating an alarm signal.

10. A self-protecting driver circuit in accordance with claim 9 wherein said active element is a P-channel VMOS enhancement mode power transistor.

11. A self-protecting driver circuit in accordance with claim 10 wherein said detector circuit means includes a PNP transistor having a base connected through a resistor to a source of said power transistor for detecting said second electrical characteristic and generating said detection signal.

12. A self-protecting driver circuit in accordance with claim 9 wherein said active element is an N-channel VMOS enhancement mode power transistor.

13. A self-protecting driver circuit in accordance with claim 12 wherein said detector means includes a PNP transistor having a base connected to a drain of said power transistor for detecting said second electrical characteristic and generating said detection signal.

14. A self-protecting driver circuit in accordance with claim 9 wherein said alarm circuit includes an NPN transistor having a base connected through a diode to receive said detection signal from said detector circuit means and generate said alarm signal.

15. A self-protecting driver circuit in accordance with claim 9 wherein the failure operating mode is an electrical short circuit.

16. In a glassware forming machine including at least one forming means for forming articles of glassware, a solenoid means for actuating the forming means, the solenoid means having a first electrical load when in an operating mode and a second lesser electrical load when in a short circuit mode, a power source, and means for generating control signals to control the operation of the forming means, a self-protecting driver circuit for controlling the solenoid means comprising: driver means responsive to the control signals for connecting the power source to the solenoid means; said driver means having an active element for limiting the amount of electrical current drawn therethrough to a predetermined amount when the solenoid means is in the short circuit mode.

17. A self-protecting driver circuit in accordance with claim 16 further including detector circuit means connected to said driver means means for detecting the short circuit mode and generating a detection signal in response thereto and alarm circuit means responsive to said detector circuit means detection signal for generating an alarm signal.

18. In a glassware forming machine including at least one forming means for forming articles of glassware, a solenoid means for actuating the forming means, the solenoid means having a first electrical load when functioning in an operating mode and a second lesser electrical load when functioning in a short circuit mode, a power source, and means for generating control signals to control the operation of the forming means, a self-protecting driver circuit for controlling the solenoid means comprising:

driver means responsive to the control signals for applying power from the power source to the solenoid means;

detector circuit means connected to said driver means for detecting a short circuit situation and generating a detection signal in response thereto; and alarm circuit means responsive to said detector circuit means detection signal for generating an alarm signal.

* * * * *